(12) United States Patent
Niwa (10) Patent No.: US 11,713,389 B2
(45) Date of Patent: Aug. 1, 2023

(54) PROPYLENE POLYMER COMPOSITION AND FILM

(71) Applicant: SUMITOMO CHEMICAL COMPANY, LIMITED, Tokyo (JP)

(72) Inventor: Yasuhito Niwa, Tokyo (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 96 days.

(21) Appl. No.: 17/529,755

(22) Filed: Nov. 18, 2021

(65) Prior Publication Data
US 2022/0162432 A1    May 26, 2022

(30) Foreign Application Priority Data

Nov. 25, 2020  (JP) ................................. 2020-195378

(51) Int. Cl.
*C08L 23/16*  (2006.01)
*C08L 23/14*  (2006.01)
(Continued)

(52) U.S. Cl.
CPC ............ *C08L 23/142* (2013.01); *B32B 27/08* (2013.01); *B32B 27/32* (2013.01); *C08L 23/16* (2013.01);
(Continued)

(58) Field of Classification Search
CPC .... C08F 2500/37; C08F 210/06; C08L 23/14; C08L 23/12
See application file for complete search history.

(56) References Cited

U.S. PATENT DOCUMENTS 4,675,247 A   6/1987   Kitamura et al.
4,786,562 A   11/1988  Kakugo et al.
(Continued)

FOREIGN PATENT DOCUMENTS

EP  1588843 A1  10/2005
JP  S60-166455 A  8/1985
(Continued)

*Primary Examiner* — Mark S Kaucher
(74) *Attorney, Agent, or Firm* — Meunier Carlin & Curfman LLC (57) ABSTRACT

An object of the present invention is to provide a propylene polymer composition capable of forming a heat seal layer that can be heat-sealed at a relatively low temperature and suppressing blocking in a film including the heat seal layer. A propylene polymer composition contains the following propylene polymer (1) and the following propylene-α-olefin copolymer (2), in which a content of the propylene polymer (1) is 2% by mass to 25% by mass with respect to 100% by mass of a total content of the propylene polymer (1) and the propylene-α-olefin copolymer (2), and the propylene polymer composition satisfies the following requirement (3):

Propylene polymer (1):

a polymer containing 94% by mass or more of a monomer unit derived from propylene.

Propylene-α-olefin copolymer (2):

a copolymer containing 60% by mass or more and less than 94% by mass of a monomer unit derived from propylene and more than 6% by mass and 40% by mass or less of a monomer unit derived from an α-olefin having 4 to 12 carbon atoms.

(Continued)

Requirement (3):
the following Expression (3-1) is satisfied in a temperature rising elution fractionation method in which ortho-dichlorobenzene is used as a solvent and a temperature range is set to 0° C. to 140° C.

$$Wb \leq -1.79 \times Th + 150 \qquad (3\text{-}1)$$

8 Claims, 1 Drawing Sheet

(51) Int. Cl.
  *B32B 27/08* (2006.01)
  *B32B 27/32* (2006.01)
(52) U.S. Cl.
  CPC ....... *B32B 2250/02* (2013.01); *B32B 2250/24* (2013.01); *B32B 2307/518* (2013.01); *B32B 2439/46* (2013.01); *B32B 2439/70* (2013.01); *C08L 2203/162* (2013.01); *C08L 2205/025* (2013.01)

(56) References Cited

U.S. PATENT DOCUMENTS

| | | | |
|---|---|---|---|
| 5,521,251 A | 5/1996 | Satoh et al. | |
| 6,268,063 B1* | 7/2001 | Kaminaka | C08L 53/00 428/515 |
| 2001/0004662 A1 | 6/2001 | Bidell et al. | |
| 2002/0049283 A1 | 4/2002 | Kume et al. | |
| 2003/0130443 A1 | 7/2003 | Suhm et al. | |
| 2003/0144448 A1 | 7/2003 | Ebara et al. | |
| 2003/0187126 A1* | 10/2003 | Ebara | C08K 3/01 524/515 |
| 2005/0113517 A1* | 5/2005 | Tayano | C08L 53/00 525/196 |
| 2011/0269929 A1 | 11/2011 | Fujiwara et al. | |
| 2020/0079941 A1* | 3/2020 | Kim | C08L 23/12 |

FOREIGN PATENT DOCUMENTS

| | | |
|---|---|---|
| JP | S63-19255 A | 1/1988 |
| JP | H07-166005 A | 6/1995 |
| JP | H10-212319 A | 8/1998 |
| JP | 11170458 A * | 6/1999 |
| JP | 2950168 B2 | 9/1999 |
| JP | H11-269328 A | 10/1999 |
| JP | 2002069143 A | 3/2002 |
| JP | 2003176321 A | 6/2003 |
| JP | 2004002761 A | 1/2004 |
| JP | 2004002762 A | 1/2004 |
| JP | 2005097559 A | 4/2005 |
| JP | 2005305767 A | 11/2005 |
| JP | 2006096936 A | 4/2006 |
| JP | 2009173870 A | 8/2009 |
| JP | 2010168545 A | 8/2010 |
| JP | 2011246699 A | 12/2011 |
| JP | 2012255166 A | 12/2021 |
| WO | 2018-025862 A1 | 2/2018 |

* cited by examiner

PROPYLENE POLYMER COMPOSITION
AND FILM

CROSS-REFERENCE TO RELATED
APPLICATIONS

The present disclosure claims benefit of priority to Japanese Patent Application No. 2020-195378, filed with the Japanese Patent Office on Nov. 25, 2020, which is incorporated herein by reference in its entirety.

BACKGROUND OF THE INVENTION

Field of the Invention

The present invention relates to a propylene polymer composition containing a propylene polymer and a film containing the propylene polymer composition.

Description of the Related Art

As a film used as various packaging materials, a film including a base layer and a heat seal layer laminated on the base layer is known. For example, a film in which various biaxially stretched films are used as a base layer and a polypropylene-based biaxially stretched film or unstretched film is used as a heat seal layer is known. A film having such a configuration is widely used as a material for forming various packaging bags. When a packaging bag is formed using such a film (bag forming processing is performed), end portions of the film are overlapped so that the heat seal layers face each other, and the end portions are heated and heat-sealed, thereby forming the packaging bag. Therefore, a sealed packaging bag can be formed.

In recent years, in accordance with acceleration of a bag forming speed, a heating time when performing heat sealing has been shortened. Therefore, a material capable of forming a heat seal layer that can be heat-sealed at a relatively low temperature has been demanded. For example, JP-A-2002-69143 discloses that a heat seal layer that can be heat-sealed at a relatively low temperature is formed using a propylene-based copolymer obtained by performing a first step of obtaining a copolymer component (A) of a specific propylene and ethylene and/or a specific α-olefin, and a second step of obtaining a copolymer component (B) of a specific propylene and ethylene and/or a specific α-olefin in the presence of the copolymer component (A).

SUMMARY OF THE INVENTION

However, when the film including such a heat seal layer that can be heat-sealed at a relatively low temperature is wound into a roll, or a plurality of films are overlapped as a sheet, so-called blocking, which is a phenomenon in which the films are hardly peeled off from each other or slidability between the films deteriorates, may occur. When such blocking occurs, it is difficult to smoothly perform subsequent film processing.

An object of the present invention is to provide a propylene polymer composition capable of forming a heat seal layer that can be heat-sealed at a relatively low temperature and suppressing blocking in a film including the heat seal layer, and a film containing the propylene polymer composition.

A propylene polymer composition according to the present invention contains the following propylene polymer (1) and the following propylene-α-olefin copolymer (2), in which a content of the propylene polymer (1) is 2% by mass to 25% by mass with respect to 100% by mass of a total content of the propylene polymer (1) and the propylene-α-olefin copolymer (2), and the propylene polymer composition satisfies the following requirement (3):

Propylene polymer (1):
a polymer containing 94% by mass or more of a monomer unit derived from propylene,
Propylene-α-olefin copolymer (2):
a copolymer containing 60% by mass or more and less than 94% by mass of a monomer unit derived from propylene and more than 6% by mass and 40% by mass or less of a monomer unit derived from an α-olefin having 4 to 12 carbon atoms,
Requirement (3):
the following Expression (3-1) is satisfied in a temperature rising elution fractionation method in which orthodichlorobenzene is used as a solvent and a temperature range is set to 0° C. to 140° C., $$Wb \le -1.79 \times Th + 150 \qquad (3\text{-}1)$$

wherein Wb represents a cumulative elution amount at 0° C. to 50° C., and Th represents a temperature (° C.) of 0° C. to 80° C. or 110° C. to 140° C. at which a cumulative elution amount is 65% by mass when a total of a cumulative elution amount at 0° C. to 80° C. and a cumulative elution amount at 110° C. to 140° C. is 100% by mass.

The film according to the present invention contains the propylene polymer composition.

According to the present invention, it is possible to provide a propylene polymer composition capable of forming a heat seal layer that can be heat-sealed at a relatively low temperature and suppressing blocking in a film including the heat seal layer, and a film containing the propylene polymer composition.

DETAILED DESCRIPTION OF THE
PREFERRED EMBODIMENTS

A propylene polymer composition according to the present invention contains a propylene polymer (1) and a propylene-α-olefin copolymer (2). Such a propylene polymer composition can be obtained by performing a first step of obtaining a propylene polymer (1) and a second step of obtaining a propylene-α-olefin copolymer (2) in the presence of the propylene polymer (1).

In the propylene polymer composition according to the present invention, a content of the propylene polymer (1) is 2% by mass to 25% by mass, preferably 3% by mass to 20% by mass, and more preferably 4% by mass to 15% by mass, with respect to 100% by mass of a total content of the propylene polymer (1) and the propylene-α-olefin copolymer (2). In addition, in the propylene polymer composition according to the present invention, a content of the propylene-α-olefin copolymer (2) is preferably 75% by mass to 98% by mass, more preferably 80% by mass to 97% by mass, and still more preferably 85% by mass to 96% by mass, with respect to 100% by mass of the total content of the propylene polymer (1) and the propylene-α-olefin copolymer (2).

When the content of the propylene polymer (1) is 2% by mass or more (that is, the content of the propylene-α-olefin copolymer (2) is 98% by mass or less), blocking resistance is improved while maintaining heat sealability of a film formed using the propylene polymer composition according to the present invention (hereinafter, simply referred to as a "film"). In addition, when the content of the propylene polymer (1) is 25% by mass or less (that is, the content of the propylene-α-olefin copolymer (2) is 75% by mass or more), the heat sealability of the film at a low temperature is improved.

Propylene polymer (1)

The propylene polymer (1) contains 94% by mass or more, preferably 95% by mass or more, and more preferably 96% by mass or more of a monomer unit derived from propylene. When the monomer unit derived from propylene is 94% by mass or more, the blocking resistance of the film is improved. In addition, the propylene polymer (1) may be a copolymer containing a monomer unit derived from ethylene and a monomer unit derived from an α-olefin having 4 to 12 carbon atoms.

The propylene polymer (1) may contain less than 6% by mass, less than 5% by mass, or less than 4% by mass of the monomer unit derived from ethylene. When the monomer unit derived from ethylene is less than 6% by mass, the heat sealability of the film at a low temperature is improved, and the blocking resistance of the film is also improved.

In addition, the propylene polymer (1) may contain less than 6% by mass, less than 5% by mass, or less than 4% by mass of the monomer unit derived from an α-olefin having 4 to 12 carbon atoms. When the monomer unit derived from an α-olefin having 4 to 12 carbon atoms is less than 6% by mass, the heat sealability of the film at a low temperature is improved, and the blocking resistance of the film is also improved.

An example of the monomer unit derived from an α-olefin having 4 to 12 carbon atoms in the propylene polymer (1) can include a monomer unit derived from 1-butene, 2-methyl-1-propene, 1-pentene, 2-methyl-1-butene, 3-methyl-1-butene, 1-hexene, 2-ethyl-1-butene, 2,3-dimethyl-1-butene, 2-methyl-1-pentene, 3-methyl-1-pentene, 4-methyl-1-pentene, 3,3-dimethyl-1-butene, 1-heptene, methyl-1-hexene, dimethyl-1-pentene, ethyl-1-pentene, trimethyl-1-butene, methylethyl-1-butene, 1-octene, methyl-1-pentene, ethyl-1-hexene, dimethyl-1-hexene, propyl-1-heptene, methylethyl-1-heptene, trimethyl-1-pentene, propyl-1-pentene, diethyl-1-butene, 1-nonene, 1-decene, 1-undecene, 1-dodecene, or the like. The monomer unit derived from an α-olefin having 4 to 12 carbon atoms is preferably a monomer unit derived from 1-butene, 1-pentene, 1-hexene, or 1-octene, more preferably a monomer unit derived from 1-butene or 1-hexene, and still more preferably a monomer unit derived from 1-butene, from the viewpoint of copolymerization characteristics, cost effectiveness, and the like.

Examples of the propylene polymer (1) can include a propylene homopolymer, a propylene-ethylene copolymer, a propylene-1-butene copolymer, a propylene-1-hexene copolymer, a propylene-ethylene-1-butene copolymer, and a propylene-ethylene-1-hexene copolymer. The propylene polymer (1) is preferably a propylene homopolymer or a propylene-ethylene copolymer, and is more preferably a propylene homopolymer.

Propylene-α-olefin copolymer (2)

The propylene-α-olefin copolymer (2) contains 60% by mass or more and less than 94% by mass, preferably 70% by mass to 92% by mass, and more preferably 75% by mass to 90% by mass of a monomer unit derived from propylene. When the monomer unit derived from propylene is 60% by mass or more, the blocking resistance of the film is improved. In addition, when the monomer unit derived from propylene is less than 94% by mass, the heat sealability of the film at a low temperature is improved.

In addition, the propylene-α-olefin copolymer (2) contains more than 6% by mass and 40% by mass or less, preferably 8% by mass to 30% by mass, and more preferably 10% by mass to 25% by mass of a monomer unit derived from an α-olefin having 4 to 12 carbon atoms. When the monomer unit derived from an α-olefin having 4 to 12 carbon atoms is more than 6% by mass, the heat sealability of the film at a low temperature is improved. In addition, when the monomer unit derived from an α-olefin having 4 to 12 carbon atoms is 40% by mass or less, the blocking resistance of the film is improved.

An example of the monomer unit derived from an α-olefin having 4 to 12 carbon atoms in the propylene-α-olefin copolymer (2) can include a monomer unit derived from 1-butene, 2-methyl-1-propene, 1-pentene, 2-methyl-1-butene, 3-methyl-1-butene, 1-hexene, 2-ethyl-1-butene, 2,3-dimethyl-1-butene, 2-methyl-1-pentene, 3-methyl-1-pentene, 4-methyl-1-pentene, 3,3-dimethyl-1-butene, 1-heptene, methyl-1-hexene, dimethyl-1-pentene, ethyl-1-pentene, trimethyl-1-butene, methylethyl-1-butene, 1-octene, methyl-1-pentene, ethyl-1-hexene, dimethyl-1-hexene, propyl-1-heptene, methylethyl-1-heptene, trimethyl-1-pentene, propyl-1-pentene, diethyl-1-butene, 1-nonene, 1-decene, 1-undecene, 1-dodecene, or the like. The monomer unit derived from an α-olefin having 4 to 12 carbon atoms is preferably a monomer unit derived from 1-butene, 1-pentene, 1-hexene, or 1-octene, more preferably a monomer unit derived from 1-butene or 1-hexene, and still more preferably a monomer unit derived from 1-butene, from the viewpoint of copolymerization characteristics, cost effectiveness, and the like.

In addition, the propylene-α-olefin copolymer (2) may further contain 2% by mass to 6% by mass or 3% by mass to 5% by mass of a monomer unit derived from ethylene. When the monomer unit derived from ethylene is 2% by mass or more, the heat sealability of the film at a low temperature is improved. In addition, when the monomer unit derived from ethylene is 6% by mass or less, the blocking resistance of the film is improved.

Examples of the propylene-α-olefin copolymer (2) can include a propylene-1-butene copolymer, a propylene-1-hexene copolymer, a propylene-ethylene-1-butene copolymer, and a propylene-ethylene-1-hexene copolymer. The propylene-α-olefin copolymer (2) is preferably a propylene-1-butene copolymer or a propylene-1-hexene copolymer, and is more preferably a propylene-1-butene copolymer.

A melt flow rate (hereinafter, also referred to as an MFR) of the propylene polymer composition according to the present invention when measured at 230° C. is not particularly limited, and is preferably 1 g/10 min to 50 g/10 min, and more preferably 3 g/10 min to 10 g/10 min. When the MFR is in the above range, fluidity or film formability when the propylene polymer composition is molded and processed is excellent. An example of a method of adjusting the MFR can include a method of melt-kneading a propylene polymer composition and an organic peroxide.

In the present invention, the MFR can be determined by the method described in the following "Examples".

The propylene polymer composition according to the present invention satisfies the following requirement (3).

Requirement (3):

the following Expression (3-1) is satisfied in a temperature rising elution fractionation method in which ortho-dichlorobenzene is used as a solvent and a temperature range is set to 0° C. to 140° C., $$Wb \leq -1.79 \times Th + 150 \quad (3\text{-}1)$$

wherein Wb represents a cumulative elution amount at 0° C. to 50° C., and Th represents a temperature (° C.) of 0° C. to 80° C. or 110° C. to 140° C. at which a cumulative elution amount is 65% by mass when a total of a cumulative elution amount at 0° C. to 80° C. and a cumulative elution amount at 110° C. to 140° C. is 100% by mass.

Wb and Th in Expression (3-1) can be adjusted by selecting the center particle size of a solid catalyst component for olefin polymerization described below. For example, when the center particle size of the solid catalyst component for olefin polymerization is 60 μm or less, Wb decreases and Th increases, when the center particle size of the solid catalyst component for olefin polymerization is 20 to 50 μm, Wb decreases and Th increases, and when the center particle size of the solid catalyst component for olefin polymerization is 30 to 40 μm, Wb decreases and Th increases.

In addition, Wb and Th in Expression (3-1) can be adjusted by selecting an external electron donor described below. For example, when alkoxysilane having a cyclic hydrocarbon group such as cyclohexylethyldimethoxysilane is used as the external electron donor, Wb decreases and Th increases.

In addition, Wb in Expression (3-1) can also be adjusted by a content of a monomer unit derived from any others than propylene contained in each of the propylene polymer (1) and the propylene-α-olefin copolymer (2). For example, when the content of the monomer unit derived from any others than propylene is increased, Wb increases.

In addition, Th in Expression (3-1) can also be adjusted by the content of the propylene polymer (1). For example, when the content of the propylene polymer (1) is increased, Th increases.

Here, specifically, "Wb" and "Th" in Expression (3-1) can be determined by the method described in the following "Examples".

Production of propylene polymer Composition

The propylene polymer composition according to the present invention can be produced by multi-stage polymerization including a first step, a second step, and subsequent steps using a catalyst for olefin polymerization.

Catalyst for olefin polymerization

The catalyst for olefin polymerization can be produced by bringing a solid catalyst component for olefin polymerization, an organoaluminum compound, and an external electron donor into contact with each other. Therefore, the catalyst for olefin polymerization contains a solid catalyst component for olefin polymerization, an organoaluminum compound, and an external electron donor.

Solid catalyst component for olefin polymerization

The solid catalyst component for olefin polymerization contains a titanium atom, a magnesium atom, a halogen atom, and an internal electron donor.

The solid catalyst component for olefin polymerization refers to a component that is present as a solid content at least in toluene and constitutes a catalyst for olefin polymerization by being combined with an organoaluminum compound and an external electron donor.

Some or all of the titanium atoms in the solid catalyst component for olefin polymerization are derived from a titanium halide compound. Some or all of the halogen atoms in the solid catalyst component for olefin polymerization are derived from a titanium halide compound.

Examples of the titanium halide compound can include titanium tetrahalide, monoalkoxytitanium trihalide, dialkoxytitanium dihalide, and trialkoxytitanium monohalide. The titanium halide compound is preferably titanium tetrahalide or monoalkoxytitanium trihalide, and more preferably titanium tetrahalide. The titanium halide compounds may be used alone or in combination of two or more thereof.

Some or all of the magnesium atoms in the solid catalyst component for olefin polymerization are derived from a magnesium compound. In addition, some of the halogen atoms in the solid catalyst component for olefin polymerization can be derived from a magnesium compound.

Examples of the magnesium compound can include dialkylmagnesium, magnesium dialkoxide, alkylmagnesium halide, alkoxymagnesium halide, aryloxymagnesium halide, and magnesium halide. The magnesium compound is preferably magnesium halide or magnesium dialkoxide.

The magnesium compounds may be used alone or in combination of two or more thereof.

The internal electron donor refers to an organic compound capable of donating an electron pair to one or a plurality of metal atoms contained in the solid catalyst component for olefin polymerization. Specific examples of the internal electron donor can include a monoester compound, a dicarboxylic acid ester compound, a diol diester compound, a γ-alkoxy ester compound, and a diether compound.

The monoester compound refers to an organic compound having one ester bond (—CO—O—) in a molecule, and is preferably an aromatic carboxylic acid ester compound or an aliphatic carboxylic acid ester compound.

The dicarboxylic acid ester compound is a compound having two ester bonds (—CO—O—) in a molecule, and refers to a compound having a structure in which two carboxylic groups of a dicarboxylic acid are esterified with a monohydric alcohol. The dicarboxylic acid ester compound is preferably an aromatic dicarboxylic acid ester compound or an aliphatic dicarboxylic acid ester compound.

The diol diester compound is a compound having two ester bonds (—CO—O—) in a molecule, and refers to a compound having a structure in which a carboxylic group of a monocarboxylic acid or a dicarboxylic acid is obtained by esterification of each of two hydroxyl groups of a diol.

The (β-alkoxy ester compound refers to a compound having an alkoxycarbonyl group and having an alkoxy group at the γ-position of the alkoxycarbonyl group.

The diether compound refers to a compound having two ether bonds in a molecule.

In addition, an internal electron donor described in JP-A-2011-246699 can also be exemplified.

Among the internal electron donors, a dicarboxylic acid ester compound, a diol diester compound, or a β-alkoxy ester compound is preferred. These internal electron donors may be used alone or in combination of two or more thereof.

The center particle size of the solid catalyst component for olefin polymerization is usually 60 μm or less, preferably 20 to 50 μm, and more preferably 30 to 40 μm.

The center particle size of the solid catalyst component for olefin polymerization can be controlled by a particle size of the magnesium compound in the solid catalyst component for olefin polymerization.

The organoaluminum compound is a compound having one or more carbon-aluminum bonds, and a specific example thereof can include the compound described in JP-A-10-212319. The organoaluminum compound is preferably trialkylaluminum, a mixture of trialkylaluminum and dialkylaluminum halide, or alkylalumoxane, and more preferably triethylaluminum, triisobutylaluminum, a mixture of triethylaluminum and diethylaluminum chloride, or tetraethyldialumoxane.

Examples of the external electron donor can include the compounds described in Japanese Patent No. 2950168, JP-A-2006-96936, JP-A-2009-173870, and JP-A-2010-168545. Among them, an oxygen-containing compound or a nitrogen-containing compound is preferred. Examples of the oxygen-containing compound can include alkoxysilicon, ether, ester, and ketone. Among them, alkoxysilicon or ether is preferred.

Specific examples of the alkoxysilicon can include cyclohexylmethyldimethoxysilane, cyclohexylethyldimethoxysilane, diiso-propyldimethoxysilane, tert-butylethyldimethoxysilane, tert-butyl-n-propyldimethoxysilane, phenyltrimethoxysilane, diphenyldimethoxysilane, dicyclobutyldimethoxysilane, dicyclopentyldimethoxysilane, tetraethoxysilane, methyltriethoxysilane, ethyltriethoxysilane, iso-butyltriethoxysilane, vinyltriethoxysilane, sec-butyltriethoxysilane, cyclohexyltriethoxysilane, cyclopentyltriethoxysilane, dimethylaminotrimethoxysilane, diethylaminotrimethoxysilane, di-n-propylaminotrimethoxysilane, dimethylaminotriethoxysilane, diethylaminotriethoxysilane, di-n-propylaminotriethoxysilane, methylethylaminotriethoxysilane, methyl-n-propylaminotriethoxysilane, tert-butylaminotriethoxysilane, diiso-propylaminotriethoxysilane, methyl-iso-propylaminotriethoxysilane, perhydroquinolinotriethoxysilane, perhydroisoquinolinotriethoxysilane, 1,2,3,4-tetrahydroquinolinotriethoxysilane, 1,2,3,4-tetrahydroisoquinolinotriethoxysilane, and octamethyleneiminotriethoxysilane.

The ether of the external electron donor is preferably a cyclic ether compound. The cyclic ether compound is a heterocyclic compound having at least one —C—O—C— bond in a ring structure, and more preferably a cyclic ether compound having at least one —C—O—C—O—C— bond in a ring structure, and particularly preferably 1,3-dioxolane or 1,3-dioxane.

Among the external electron donors, cyclohexylethyldimethoxysilane is preferred.

These external electron donors may be used alone or in combination of two or more thereof.

A method of bringing a solid catalyst component for olefin polymerization, an organoaluminum compound, and an external electron donor into contact with each other when producing a catalyst for olefin polymerization is not particularly limited as long as the catalyst for olefin polymerization is produced. The contact is performed in the presence or absence of a solvent. A mixture obtained by the contact may be fed to a polymerization tank, the individual components may be separately fed to a polymerization tank to be brought into contact with each other in the polymerization tank, or a mixture obtained by bringing any two components into contact with each other and the remaining components may be separately fed to a polymerization tank to be brought into contact with each other in the polymerization tank.

A use amount of the organoaluminum compound is preferably 0.01 to 1,000 μmol, and more preferably 0.1 to 500 μmol, with respect to 1 mg of the solid catalyst component for olefin polymerization.

A use amount of the external electron donor is preferably 0.0001 to 1,000 μmol, more preferably 0.001 to 500 μmol, and still more preferably 0.01 to 150 μmol, with respect to 1 mg of the solid catalyst component for olefin polymerization.

Production of propylene polymer composition

As a polymerization method of the propylene polymer composition according to the present invention, a known polymerization method can be used. Examples of the polymerization method of the propylene polymer composition can include a solvent polymerization method using an inert solvent represented by a hydrocarbon compound such as hexane, heptane, octane, decane, cyclohexane, methylcyclohexane, benzene, toluene, or xylene, a bulk polymerization method using a liquid monomer as a solvent, and a gas phase polymerization method performed in a gaseous monomer. A bulk polymerization method or gas phase polymerization method in which a post-treatment and the like are easily performed is preferred. The polymerization method may be a batch type method or a continuous type method.

The propylene polymer composition according to the present invention is produced by multi-stage polymerization including a first step, a second step, and subsequent steps using the above polymerization method. The polymerization method in the first step and the polymerization methods in the second step and the subsequent steps may be the same as or different from each other. From the viewpoint of polymerization activity and easiness of the post-treatment, it is preferable that the first step is a step of performing polymerization under the absence of an inert solvent and each of the second step and the subsequent steps is a step in which polymerization is performed in a gas phase. In addition, the polymerization in the first step and the polymerization in each of the second step and the subsequent steps may be performed in the same polymerization tanks (reactors) or in different polymerization tanks (reactors).

Examples of a method of producing the propylene polymer composition according to the present invention can include a solvent-solvent polymerization method, a bulk-bulk polymerization method, a gas phase-gas phase polymerization method, a solvent-gas phase polymerization method, a bulk-gas phase-gas phase polymerization method, a solvent-gas phase-gas phase polymerization method, and a bulk-gas phase-gas phase polymerization method, and a bulk-gas phase polymerization method, a gas phase-gas phase polymerization method, or a bulk-gas phase-gas phase polymerization method is preferred.

A polymerization temperature in the first step is not particularly limited, and is preferably 20° C. to 180° C., and more preferably 30° C. to 100° C., from the viewpoint of productivity and control of the content of the propylene polymer (1).

A polymerization temperature in each of the second step and the subsequent steps may be the same as or different from the polymerization temperature in the first step, and is preferably 20° C. to 180° C., and more preferably 30° C. to 100° C.

The method of producing the propylene polymer composition according to the present invention may include a step of performing deactivation of a catalyst, desolvation, demonomer, drying, granulation, or the like as a post-treatment, if necessary.

Additives or another resin may be added to the propylene polymer composition according to the present invention, if necessary, in a range in which the object and effects of the present invention are not impaired. Examples of the additives can include an antioxidant, an ultraviolet absorber, an antistatic agent, a lubricant, a nucleating agent, an adhesive, and an antifogging agent. In addition, as a resin, for example, a polyethylene-based resin, a polypropylene-based resin, another polyolefin-based resin, or the like may be added.

The propylene polymer composition according to the present invention can be used as a material for forming various films. Examples of the film can include a film including a single layer formed using the propylene polymer composition according to the present invention and a film including a multi-layer (at least two layers) including a layer formed using the propylene polymer composition according to the present invention. In addition, examples of the film formed using the propylene polymer composition according to the present invention can include a film for packaging food and a film for packaging clothing, and a film for packaging food is preferred. In addition, such a film may be unstretched, or may be uniaxially or biaxially stretched.

A method of producing the film obtained using the propylene polymer composition according to the present invention is not particularly limited, and examples thereof can include an inflation method, a T-die method, and a calender method that are usually used.

In addition, examples of the method of producing the film obtained using the propylene polymer composition according to the present invention can include a method of forming a film using the propylene polymer composition according to the present invention alone, and a method of producing a film using the propylene polymer composition according to the present invention and another resin into a multi-layer (at least two layers). Examples of the method of forming the multi-layer can include a co-extrusion molding method, an extrusion lamination method, a heat lamination method, and a dry lamination method that are usually used.

In addition, an example of the method of producing the film obtained using the propylene polymer composition according to the present invention can include a method of producing a film by stretching a molded film or sheet obtained in advance by the above method. An example of a stretching method can include a uniaxial or biaxial stretching method by a roll stretching method, a tenter stretching method, a tubular stretching method, or the like. An unstretching co-extrusion molding method or a biaxial stretching method is preferred from the viewpoint of a balance of properties between heat sealability at a low temperature, transparency, and rigidity of the film.

In addition, an example of the method of producing the film obtained using the propylene polymer composition according to the present invention can include a method in which various biaxially stretched films and the like are used as a base layer and the propylene polymer composition according to the present invention is applied to the base layer in a molten state to form a packaging film including a multi-layer (at least two layers).

The packaging film formed as described above can be used as a material for forming a packaging bag. Specifically, the propylene polymer composition according to the present invention can form a heat seal layer that can be heat-sealed at a relatively low temperature (preferably 80° C. to 120° C., and more preferably 96° C. to 118° C.). Therefore, the film including such a heat seal layer is deformed to allow the heat seal layers to face each other, and a location at which the heat seal layers face each other is heated to be heat-sealed, whereby a packaging bag can be formed. An example of the film for forming a packaging bag can include a multi-layer film in which heat seal layers (biaxially stretched or unstretched films) formed using the propylene polymer composition according to the present invention are laminated on the base layer of the biaxially stretched film. The use of the packaging bag is not particularly limited, and examples thereof can include the uses for food, clothing, general merchandise, and the like.

As described above, according to the propylene polymer composition according to the present invention, a heat seal layer that can be heat-sealed at a relatively low temperature can be formed, and occurrence of blocking in a film including the heat seal layer can be suppressed.

That is, when the propylene polymer composition according to the present invention contains the following propylene polymer (1) and the following propylene-α-olefin copolymer (2), a content of the propylene polymer (1) is 2% by mass to 25% by mass with respect to 100% by mass of a total content of the propylene polymer (1) and the propylene-α-olefin copolymer (2), and the propylene polymer composition satisfies the following requirement (3), a heat seal layer that can be heat-sealed at a relatively low temperature can be formed, and the occurrence of blocking in a film including the heat seal layer can be suppressed.

Propylene polymer (1):
a polymer containing 94% by mass or more of a monomer unit derived from propylene.

Propylene-α-olefin copolymer (2):
a copolymer containing 60% by mass or more and less than 94% by mass of a monomer unit derived from propylene and more than 6% by mass and 40% by mass or less of a monomer unit derived from an α-olefin having 4 to 12 carbon atoms.

Requirement (3):
the following Expression (3-1) is satisfied in a temperature rising elution fractionation method in which orthodichlorobenzene is used as a solvent and a temperature range is set to 0° C. to 140° C.

$$Wb \leq -1.79 \times Th + 150 \qquad (3\text{-}1)$$

wherein Wb represents a cumulative elution amount at 0° C. to 50° C., and Th represents a temperature (° C.) of 0° C. to 80° C. or 110° C. to 140° C. at which a cumulative elution amount is 65% by mass when a total of a cumulative elution amount at 0° C. to 80° C. and a cumulative elution amount at 110° C. to 140° C. is 100% by mass.

In addition, in the propylene polymer composition according to the present invention, when a monomer unit derived from an α-olefin having 4 to 12 carbon atoms contained in the propylene-α-olefin copolymer (2) is a monomer unit derived from 1-butene, a propylene-α-olefin copolymer can be produced at a low cost.

In addition, in the propylene polymer composition according to the present invention, when the propylene-α-olefin copolymer (2) contains 70% by mass to 92% by mass of a monomer unit derived from propylene and 8% by mass to 30% by mass of a monomer unit derived from an α-olefin having 4 to 12 carbon atoms, the heat sealability of the film at a low temperature is improved.

In addition, in the propylene polymer composition according to the present invention, when the propylene-α-olefin copolymer (2) further contains 2% by mass to 6% by mass of a monomer unit derived from ethylene, the heat sealability of the film at a low temperature is improved.

In addition, in the propylene polymer composition according to the present invention, when the propylene polymer (1) contains 95% by mass or more of a monomer unit derived from propylene, the blocking resistance of the film is improved.

In addition, in the propylene polymer composition according to the present invention, when the content of the propylene polymer (1) is 3% by mass to 20% by mass, the blocking resistance of the film is improved.

In addition, the film according to the present invention contains any of propylene polymer compositions described above, such that the film can be heat-sealed at a relatively low temperature and blocking hardly occurs.

In addition, the film according to the present invention is a biaxially stretched film, such that the film has excellent transparency and mechanical properties.

EXAMPLES

Measured values of each item in Examples and Comparative Examples were measured by the following method.

(1) Center particle size (unit: μm) of solid catalyst component for olefin polymerization The center particle size of a solid catalyst component for olefin polymerization was measured by a laser diffraction and scattering method according to the standard ISO 13320:2009. A refractive index of toluene was 1.49 and a refractive index of a solid catalyst component was 1.53 to 0.1 i, the refractive index being obtained using a laser diffraction particle size distribution measuring apparatus ("Mastersizer 3000", manufactured by Malvern Panalytical Ltd.) as a measuring apparatus. A toluene solvent from which moisture was removed with alumina or the like in advance was injected into a dispersing apparatus (hydroMV) whose opening was sealed with nitrogen, and the inside of a circulation system including a measurement cell was filled with the toluene solvent. A stirring speed was set to 2,000 rpm, a solid catalyst component for olefin polymerization was injected so that a scattering intensity was 3 to 10% while the toluene solvent in the measurement cell was circulated without an ultrasonic dispersion treatment, and a particle size was measured. The center particle size was determined using the obtained particle size volume-based distribution diagram. The solid catalyst component for olefin polymerization was handled so as not to come into contact with the air and moisture, and was not subjected to a pre-treatment.

(2) Melt Flow Rate (MFR, Unit: g/10 Min)

A melt flow rate (MFR) of the propylene polymer composition was measured at a temperature of 230° C. and a load of 21.18 N according to the method A defined in JIS K7210-1:2014.

(3) Comonomer Content (Unit: Wt %)

A comonomer content in the propylene polymer composition (a content of a monomer unit other than a propylene monomer unit) was determined by performing measurement by infrared spectroscopy using the method described on page 616 and subsequent pages of Polymer Analysis Handbook (published by KINOKUNIYA COMPANY LTD., 1995). Then, contents of the propylene monomer unit and other monomer units contained in each polymer were calculated based on the conditions for producing the propylene polymer composition.

(4) Calculation of Wb (Unit: Wt %), Th (Unit: ° C.), and Th' (Unit: ° C.) by Temperature Rising Elution Fractionation (TREF)

The measurement was performed using a CFC apparatus (Cross fractionation chromatograph, Automated 3D analyzer CFC-2, manufactured by PolymerChar).

To 40 mg of a propylene polymer composition, 20 mL of ortho-dichlorobenzene (ODCB) containing 0.05 w/V % dibutylhydroxytoluene (BHT) was added, and heating and stirring were performed at 145° C. for 60 minutes, thereby preparing a sample solution.

0.5 mL of the obtained sample solution was injected into a TREF column (filler: SUS beads, manufactured by PolymerChar) in the CFC apparatus held at 145° C., and the solution was held for 20 minutes.

The temperature of the TREF column in the CFC apparatus was lowered from 145° C. to 100° C. at a rate of 40° C./min, and then, the temperature was held at 100° C. for 20 minutes.

The temperature of the TREF column in the CFC apparatus was lowered from 100° C. to 0° C. at a rate of 0.5° C./min, and then, the temperature was held at 0° C. for 30 minutes.

The temperature of the TREF column was raised at a rate of 40° C./min while flowing ODCB from a pipe to the TREF column in the CFC apparatus at a rate of 1 ml/min, and then, the temperature was held for 30 minutes, thereby measuring an elution amount of the propylene polymer composition eluted from the TREF column at each temperature with GPC (built in CFC) equipped with an infrared spectrophotometer. The measurement was performed at 0° C., 10° C., 20° C., 30° C., 35° C., 40° C., 45° C., 50° C., 55° C., 60° C., 65° C., 70° C., 75° C., 80° C., 85° C., 90° C., 95° C., 100° C., 104° C., 108° C., 112° C., 114° C., 116° C., 118° C., 120° C., 122° C., 124° C., 126° C., and 140° C.

A temperature-cumulative elution amount curve from 0° C. to 140° C. was obtained by arithmetic processing of data processing software built in the CFC apparatus.

From the obtained cumulative elution amount curve, a cumulative elution amount to 50° C. was defined as Wb. In addition, when the total of the cumulative elution amount at 0° C. to 80° C. and the cumulative elution amount of 110° C. to 140° C. was 100% by mass, a temperature of 0° C. to 80° C. or 110° C. to 140° C. at which the cumulative elution amount was 65% by mass was defined as Th. In addition, when the cumulative elution amount at 0° C. to 140° C. was 100% by mass, a temperature of 0° C. to 140° C. at which the cumulative elution amount was 65% by mass was defined as Th'.

(5) Production of Stretched Film

A propylene polymer composition was used as a material for a surface layer, FS2011DG3 (a propylene polymer, Tm=159° C., MFR=3 g/10 min, manufactured by Sumitomo Chemical Co., Ltd.) was used as a material for a base layer, and a co-extrusion pilot tenter equipped with two extruders, one co-extrusion T-die, a longitudinal stretching machine, and a lateral stretching machine was used, thereby producing a multi-layer biaxially stretched film.

Specifically, first, the propylene polymer composition was fed to one extruder, melt-kneading was performed at 230° C., FS2011DG3 was fed to the other extruder, and melt-kneading was performed at 260° C. The melt-kneaded product melt-kneaded in each of the extruders was fed to one co-extrusion T-die. The melt-kneaded product extruded from the T-die as a two layer structure of the surface layer and the base layer was rapidly cooled and solidified with a cooling roll at 30° C. and a line rate of 5 m/min, thereby obtaining a cast sheet. The obtained cast sheet was stretched 5 times in a longitudinal direction at a stretching temperature of 120° C. by a roll peripheral speed difference of the longitudinal stretching machine. Subsequently, the cast sheet was stretched 8 times in a lateral direction at a stretching temperature of 157° C. and a line rate of 25 m/min by the lateral stretching machine equipped with a clip, and a heat treatment was performed at 165° C., thereby obtaining a multi-layer biaxially stretched film having a thickness of the surface layer/a thickness of the base layer of 1 μm/20 μm.

(6) Heat Sealing Temperature (HST, Unit: ° C.)

Heat sealing was performed by overlapping the surface layers of two multi-layer biaxially stretched films and bonding the surface layers at a load of 2 kg/cm$^2$ for 2 seconds using a heat sealer (manufactured by Toyo Seiki Seisakusho, Ltd.) heated at a predetermined temperature. The heat-sealed sample was held under conditions of a temperature of 23° C. and a humidity of 50% for 24 hours, and then, a sealing temperature at which a peel resistance force when the sample was peeled off under conditions of a temperature of 23° C., a humidity of 50%, a peel rate of 200 mm/min, and a peel angle of 180° was 300 g/25 mm was determined. The determined sealing temperature was defined as a heat sealing temperature.

(7) Blocking Strength (Unit: N/12 cm$^2$)

Surface layers of two multi-layer biaxially stretched films (100 mm×30 mm) were overlapped with each other, a weight having an installation area of 40 mm×30 mm and a weight of 500 g was placed, and a heat treatment was performed at 60° C. for 3 hours.

Thereafter, the sample was allowed to stand under conditions of a temperature of 23° C. and a humidity of 50% for 30 minutes or longer, and a shear peeling force was measured at a tensile rate of 200 mm/min. The measured shear peeling force was defined as a blocking strength.

Synthesis of solid catalyst component 1 for olefin polymerization

Gas in a reaction vessel equipped with a stirrer was replaced with nitrogen gas. Thereafter, toluene (60.1 L) and titanium tetrachloride (22.3 L) were added into the reaction vessel, and stirring was performed, thereby obtaining a toluene solution of titanium tetrachloride. Thereafter, magnesium diethoxide (particle size: 30 μm, 11 kg) was added into the reaction vessel in 6 times every 72 minutes while the temperature in the reaction vessel was set to 0° C. or lower and stirring was performed. Thereafter, the temperature in the reaction vessel was set to 2° C. or lower and was held for 120 minutes, and then, the temperature in the reaction vessel was set to 10° C. or lower and was held for 120 minutes. Thereafter, toluene (14.3 L) was added into the reaction vessel, the temperature in the reaction vessel was set to 60° C., and ethyl 2-ethoxymethyl-3,3-dimethylbutanoate (4.0 kg) was added. Thereafter, the temperature in the reaction vessel was set to 110° C., and stirring was performed for 3 hours. The obtained reaction mixture was subjected to solid-liquid separation at 110° C., and then, the obtained solid was washed with 83 L of toluene at 95° C. 3 times. Thereafter, toluene (33 L) was added into the reaction vessel, the temperature in the reaction vessel was set to 60° C., and titanium tetrachloride (22 L) was added. Thereafter, the temperature in the reaction vessel was set to 105° C., and stirring was performed for 30 minutes. The obtained reaction mixture was subjected to solid-liquid separation at 105° C., the obtained solid was washed with 83 L of toluene at 60° C. 3 times and then washed with hexane (83 L) 3 times, and drying was performed, thereby obtaining a solid catalyst component 1 for olefin polymerization (center particle size: 32 μm, 9.0 kg).

Synthesis of solid catalyst component 2 for olefin polymerization

Gas in a reaction vessel equipped with a stirrer was replaced with nitrogen gas. Thereafter, toluene (52.8 L) and titanium tetrachloride (33.3 L) were added into the reaction vessel, and stirring was performed, thereby obtaining a toluene solution of titanium tetrachloride. Thereafter, magnesium diethoxide (particle size: 71 μm, 11 kg) was added into the reaction vessel in 6 times every 72 minutes while the temperature in the reaction vessel was set to 0° C. or lower and stirring was performed. Thereafter, the temperature in the reaction vessel was set to 2° C. or lower and was held for 120 minutes. Thereafter, ethyl 2-ethoxymethyl-3,3-dimethylbutanoate (0.77 kg) was added into the reaction vessel in a state where the temperature in the reaction vessel was held at 2° C. or lower. Thereafter, the temperature in the reaction vessel was set to 10° C. or lower and was held for 120 minutes. Thereafter, toluene (14.3 L) was added into the reaction vessel, the temperature in the reaction vessel was set to 60° C., and ethyl 2-ethoxymethyl-3,3-dimethylbutanoate (4.0 kg) was added. Thereafter, the temperature in the reaction vessel was set to 110° C., and stirring was performed for 3 hours. The obtained reaction mixture was subjected to solid-liquid separation at 110° C., and then, the obtained solid was washed with 83 L of toluene at 95° C. 3 times. Thereafter, toluene (34 L) was added into the reaction vessel, the temperature in the reaction vessel was set to 60° C., and titanium tetrachloride (22 L) and ethyl 2-ethoxymethyl-3,3-dimethylbutanoate (0.95 kg) were added. Thereafter, the temperature in the reaction vessel was set to 110° C., and stirring was performed for 30 minutes. The obtained reaction mixture was subjected to solid-liquid separation at 110° C., the obtained solid was washed with 83 L of toluene at 60° C. 3 times and then washed with hexane (83 L) 3 times, and drying was performed, thereby obtaining a solid catalyst component 2 for olefin polymerization (center particle size: 65 μm, 10.9 kg).

Example 1

Production of propylene polymer composition 1

Preliminary activation of solid catalyst component for olefin polymerization n-Hexane (1.6 L) subjected to a dehydration treatment and a degassing treatment, triethylaluminum (73.7 mmol), cyclohexylethyldimethoxysilane (5.9 mmol) as an external electron donor, and the solid catalyst component 1 for olefin polymerization (22.5 g) were added into an autoclave equipped with a stirrer having an internal volume of 3 L, the temperature in the autoclave was set to 5 to 15° C., propylene (101.3 g) was continuously fed for 30 minutes to perform preliminary activation, thereby obtaining a slurry of a prepolymerization catalyst. The obtained slurry of the prepolymerization catalyst was transferred into an autoclave equipped with a stirrer having an internal volume of 200 L, and then, liquid butane (140 L) was added to dilute the slurry.

Polymerization

First Step

Into a loop type bulk polymerization tank having an internal volume of 30 L, liquid propylene (75 kg/hr) and hydrogen (13.3 NL/hr) were fed, and the obtained prepolymerization catalyst (4.7 g/hr), triethylaluminum (33 mmol/hr), and cyclohexylethyldimethoxysilane (11 mmol/hr) as an external electron donor were further fed, and the liquid propylene was polymerized at a polymerization temperature of 40° C. and a polymerization pressure of 3.8 MPa, thereby obtaining a propylene polymer component (1.3 kg/hr). A slurry containing the obtained propylene polymer component was continuously transferred to a second step.

Second Step

Using a gas-phase fluidized bed type reaction vessel equipped with a stirrer having an internal volume of 1 m$^3$, under conditions in which a polymer retention amount in a fluidized bed was 85 kg, a polymerization temperature in the fluidized bed was 70° C., a polymerization pressure in the fluidized bed was 1.2 MPa, a gas superficial velocity inside the reaction vessel was 0.30 m/sec, an effective hydrogen concentration (hydrogen concentration/(hydrogen concentration+propylene concentration+ethylene concentration+1-butene concentration)) in a gas phase portion was 1.2 mol %, an effective ethylene concentration (ethylene concentration/(propylene concentration+ethylene concentration+1-butene concentration)) in the gas phase portion was 2.5 mol %, and an effective 1-butene concentration (1-butene concentration/(propylene concentration+ethylene concentration+1-butene concentration)) in the gas phase portion was 6.7 mol %, propylene, hydrogen, ethylene, and 1-butene were fed to obtain a propylene polymer composition (25.8 kg/hr) in the presence of the slurry containing the propylene polymer component transferred from the loop type bulk polymerization tank in the first step. The propylene polymer composition was continuously transferred to a post-treatment step.

Post-Treatment Step

Water (10 mL/hr) and nitrogen gas (20 m$^3$/hr) were fed to the propylene polymer composition transferred from the gas-phase fluidized bed type reaction vessel to a drying tank to dry the propylene polymer composition and to deactivate the catalyst.

0.01 parts by weight of DHT-4C (manufactured by Kyowa Chemical Industry Co. Ltd.), 0.1 parts by weight of IRGANOX1010 (manufactured by BASF Japan Ltd.), and 0.05 parts by weight of IRGAFOS168 (manufactured by BASF Japan Ltd.) were blended with respect to 100 parts by weight of the obtained propylene polymer composition, and melt-extrusion was performed, thereby obtaining a pellet-like propylene polymer composition 1. Analysis values and evaluation results of the obtained propylene polymer composition 1 are shown in Table 3.

Example 2

Production of propylene polymer composition 2

A propylene polymer composition 2 was obtained in the same manner as that of Example 1 except that the conditions of the first step and the second step were changed as shown in Table 1. Analysis values and evaluation results of the obtained propylene polymer composition 2 are shown in Table 3.

Example 3

Production of propylene polymer composition 3

A propylene polymer composition 3 was obtained in the same manner as that of Example 1 except that the conditions of the first step and the second step were changed as shown in Table 1. Analysis values and evaluation results of the obtained propylene polymer composition 3 are shown in Table 3.

Example 4

Production of propylene polymer composition 4

A propylene polymer composition 4 was obtained in the same manner as that of Example 1 except that the conditions of the first step and the second step were changed as shown in Table 1. Analysis values and evaluation results of the obtained propylene polymer composition 4 are shown in Table 3.

Example 5

Production of propylene polymer composition 5

A propylene polymer composition 5 was obtained in the same manner as that of Example 1 except that the conditions of the first step and the second step were changed as shown in Table 1. Analysis values and evaluation results of the obtained propylene polymer composition 5 are shown in Table 3.

Example 6

Production of propylene polymer composition 6

A propylene polymer composition 6 was obtained in the same manner as that of Example 1 except that the conditions of the first step and the second step were changed as shown in Table 1. Analysis values and evaluation results of the obtained propylene polymer composition 6 are shown in Table 3.

Comparative Example 1

Production of propylene polymer composition C1

Preliminary activation of solid catalyst component for olefin polymerization n-Hexane (1.6 L) subjected to a dehydration treatment and a degassing treatment, triethylaluminum (65.2 mmol), tert-butyl-n-propyldimethoxysilane (5.2 mmol) as an external electron donor, and the solid catalyst component 2 for olefin polymerization (19.9 g) were added into an autoclave equipped with a stirrer having an internal volume of 3 L, the temperature in the autoclave was set to 5 to 15° C., propylene (99.5 g) was continuously fed for 30 minutes to perform preliminary activation, thereby obtaining a slurry of a prepolymerization catalyst. The obtained slurry of the prepolymerization catalyst was transferred into an autoclave equipped with a stirrer having an internal volume of 200 L, and then, liquid butane (140 L) was added to dilute the slurry.

Polymerization

First Step

Into a loop type bulk polymerization tank having an internal volume of 30 L, liquid propylene (75 kg/hr) and hydrogen (26.4 NL/hr) were fed, and the obtained prepolymerization catalyst (4.6 g/hr), triethylaluminum (34 mmol/hr), and tert-butyl-n-propyldimethoxysilane (11 mmol/hr) as an external electron donor were further fed, and the liquid propylene was polymerized at a polymerization temperature of 50° C. and a polymerization pressure of 3.9 MPa, thereby obtaining a propylene polymer component (1.4 kg/hr). A slurry containing the obtained propylene polymer component was continuously transferred to a second step.

Second Step

Using a gas-phase fluidized bed type reaction vessel equipped with a stirrer having an internal volume of 1 m$^3$, under conditions in which a polymer retention amount in a fluidized bed was 69 kg, a polymerization temperature in the fluidized bed was 70° C., a polymerization pressure in the fluidized bed was 1.2 MPa, a gas superficial velocity inside the reaction vessel was 0.30 m/sec, an effective hydrogen concentration (hydrogen concentration/(hydrogen concentration+propylene concentration+ethylene concentration+1-butene concentration)) in a gas phase portion was 4.4 mol %, an effective ethylene concentration (ethylene concentration/(propylene concentration+ethylene concentration+1-butene concentration)) in the gas phase portion was 3.1 mol %, and an effective 1-butene concentration (1-butene concentration/(propylene concentration+ethylene concentration+1-butene concentration)) in the gas phase portion was 14.5 mol %, propylene, hydrogen, ethylene, and 1-butene were fed to obtain a propylene polymer composition (27.0 kg/hr) in the presence of the slurry containing the propylene polymer component transferred from the loop type bulk polymerization tank in the first step. The propylene polymer composition was continuously transferred to a post-treatment step.

Post-Treatment Step

Water (10 mL/hr) and nitrogen gas (20 m³/hr) were fed to the propylene polymer composition transferred from the gas-phase fluidized bed type reaction vessel to a drying tank to dry the propylene polymer composition and to deactivate the catalyst.

0.01 parts by weight of DHT-4C (manufactured by Kyowa Chemical Industry Co. Ltd.), 0.1 parts by weight of IRGANOX1010 (manufactured by BASF Japan Ltd.), and 0.05 parts by weight of IRGAFOS168 (manufactured by BASF Japan Ltd.) were blended with respect to 100 parts by weight of the obtained propylene polymer composition, and melt-extrusion was performed, thereby obtaining a pellet-like propylene polymer composition C1. Analysis values and evaluation results of the obtained propylene polymer composition C1 are shown in Table 4.

Comparative Example 2

Production of propylene polymer composition C2

A propylene polymer composition C2 was obtained in the same manner as that of Comparative Example 1 except that the conditions of the first step and the second step were changed as shown in Table 2. Analysis values and evaluation results of the obtained propylene polymer composition C2 are shown in Table 4.

Figure 1:
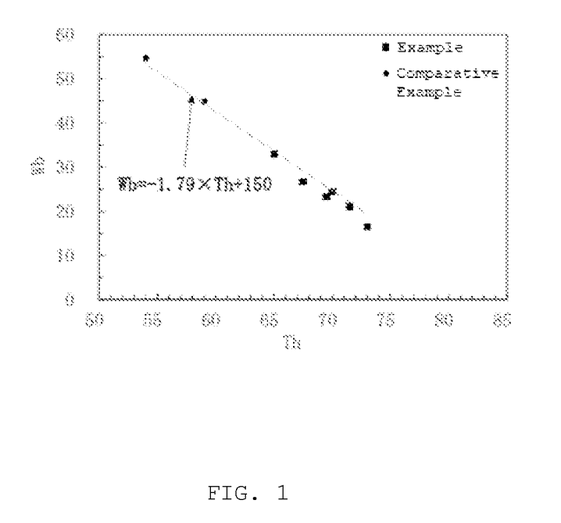
FIG. 1 is a graph showing the relationship between Wb and Th from the test results of Examples.
Figure 2:
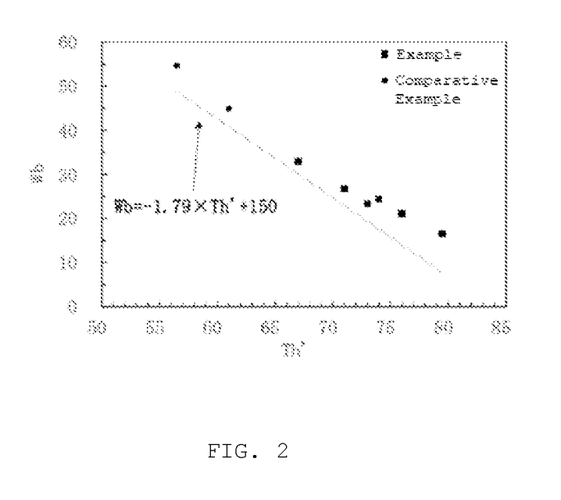
FIG. 2 is a graph showing the relationship between Wb and Th' from the test results of Examples.

For each of Examples and Comparative Examples, the relationship between Wb and Th is shown in the graph of FIG. 1, and the relationship between Wb and Th' is shown in the graph of FIG. 2. In addition, approximate straight lines were obtained from the graphs of FIGS. 1 and 2, and an equation indicating each approximate straight line was obtained. Referring to FIG. 1, it is recognized that the plot of each Comparative Example is located on the upper side of the approximate straight line and the plot of each Examples is located on the lower side of the approximate straight line. On the other hand, referring to FIG. 2, it is recognized that the plot of each of Comparative Examples and Examples is located on the upper side of the approximate straight line. That is, Examples and Comparative Examples can be distinguished from each other by satisfying the following Expression (3-1).

$$Wb \leq -1.79 \times Th + 150 \qquad (3\text{-}1)$$

wherein Wb represents a cumulative elution amount at 0° C. to 50° C., and Th represents a temperature (° C.) of 0° C. to 80° C. or 110° C. to 140° C. at which a cumulative elution amount is 65% by mass when a total of a cumulative elution amount at 0° C. to 80° C. and a cumulative elution amount at 110° C. to 140° C. is 100% by mass.

TABLE 1

| | | Example 1 | Example 2 | Example 3 | Example 4 | Example 5 | Example 6 |
|---|---|---|---|---|---|---|---|
| Preliminary activation | Solid catalyst component 1 for olefin polymerization Use amount (g) Center particle size (μm) | 22.5 g 32 μm | 22.5 g 32 μm | 22.5 g 32 μm | 22.5 g 32 μm | 22.5 g 32 μm | 22.5 g 32 μm |
| | n-Hexane (L) | 1.6 | 1.6 | 1.6 | 1.6 | 1.6 | 1.6 |
| | Triethylaluminum (mmol) | 73.7 | 73.7 | 73.7 | 73.7 | 73.7 | 73.7 |
| | External electron donor | Cyclohexylethyldimethoxysilane | Cyclohexylethyldimethoxysilane | Cyclohexylethyldimethoxysilane | Cyclohexylethyldimethoxysilane | Cyclohexylethyldimethoxysilane | Cyclohexylethyldimethoxysilane |
| | External electron donor (mmol) | 5.9 | 5.9 | 5.9 | 5.9 | 5.9 | 5.9 |
| | Propylene (g) | 101.3 | 101.3 | 101.3 | 101.3 | 101.3 | 101.3 |
| First step | Propylene (kg/h) | 75 | 75 | 75 | 75 | 65 | 40 |
| | Hydrogen (NL/h) | 13.3 | 13.3 | 13.4 | 13.3 | 15.8 | 9.5 |
| | Solid catalyst component (g/h) | 0.85 | 0.85 | 0.89 | 0.87 | 0.35 | 0.35 |
| | Triethylaluminum (mmol/h) | 33 | 33 | 33 | 35 | 36 | 36 |
| | External electron donor | Cyclohexylethyldimethoxysilane | Cyclohexylethyldimethoxysilane | Cyclohexylethyldimethoxysilane | Cyclohexylethyldimethoxysilane | Cyclohexylethyldimethoxysilane | Cyclohexylethyldimethoxysilane |
| | External electron donor (mmol/h) | 11 | 11 | 11 | 11 | 12 | 12 |
| | Polymerization temperature (° C.) | 40 | 40 | 40 | 40 | 53 | 40 |
| | Polymerization pressure (MPaG) | 3.8 | 3.8 | 3.9 | 3.9 | 3.9 | 3.9 |
| | Polymerization amount (kg/h) | 1.3 | 1.3 | 1.4 | 1.4 | 1.5 | 1.0 |

TABLE 1-continued

|  |  | Example 1 | Example 2 | Example 3 | Example 4 | Example 5 | Example 6 |
|---|---|---|---|---|---|---|---|
| Second step | Retention amount in fluidized bed (kg) | 85 | 85 | 85 | 79 | 79 | 69 |
|  | Polymerization temperature (° C.) | 70 | 70 | 70 | 70 | 79 | 79 |
|  | Polymerization pressure (MPaG) | 1.2 | 1.2 | 1.2 | 1.2 | 1.8 | 1.8 |
|  | Gas superficial velocity (m/s) | 0.30 | 0.30 | 0.30 | 0.30 | 0.27 | 0.27 |
|  | Hydrogen concentration (mol %) | 1.2 | 1.1 | 1.5 | 1.6 | 0.9 | 1.0 |
|  | Ethylene concentration (mol %) | 2.5 | 2.6 | 2.4 | 2.5 | 2.6 | 2.2 |
|  | 1-Butene concentration (mol %) | 6.7 | 10.7 | 12.5 | 14.2 | 7.7 | 10.8 |
|  | Polymerization amount (kg/h) | 24.4 | 25.8 | 27.3 | 27.6 | 19.1 | 15.6 |
|  | Propylene polymer composition Acquisition amount (kg/h) | 25.8 | 27.2 | 28.7 | 29.0 | 20.6 | 16.6 |

TABLE 2

|  |  | Comparative Example 1 | Comparative Example 2 |
|---|---|---|---|
| Preliminary activation | Solid catalyst component 2 for olefin polymerization Use amount (g) | 19.9 g | 19.9 g |
|  | Center particle size (μm) | 65 μm | 65 μm |
|  | n-Hexane (L) | 1.6 | 1.6 |
|  | Triethylaluminum (mmol) | 65.2 | 65.2 |
|  | External electron donor | tert-Butyl-n-propyldimethoxysilane | tert-Butyl-n-propyldimethoxysilane |
|  | External electron donor (mmol) | 5.2 | 5.2 |
|  | Propylene (g) | 99.5 | 99.5 |
| First step | Propylene (kg/h) | 75 | 65 |
|  | Hydrogen (NL/h) | 26.4 | 22.8 |
|  | Solid catalyst component (g/h) | 0.74 | 0.63 |
|  | Triethylaluminum (mmol/h) | 34 | 33 |
|  | External electron donor | tert-Butyl-n-propyldimethoxysilane | tert-Butyl-n-propyldimethoxysilane |
|  | External electron donor (mmol/h) | 11 | 11 |
|  | Polymerization temperature (° C.) | 50 | 50 |
|  | Polymerization pressure (MPaG) | 3.9 | 3.9 |
|  | Polymerization amount (kg/h) | 1.4 | 1.4 |
| Second step | Retention amount in fluidized bed (kg) | 69 | 80 |
|  | Polymerization temperature (° C.) | 70 | 70 |
|  | Polymerization pressure (MPaG) | 1.2 | 1.2 |
|  | Gas superficial velocity (m/s) | 0.30 | 0.30 |
|  | Hydrogen concentration (mol %) | 4.4 | 3.8 |
|  | Ethylene concentration (mol %) | 3.1 | 3.1 |
|  | 1-Butene concentration (mol %) | 14.5 | 17.7 |
|  | Polymerization amount (kg/h) | 25.6 | 27.3 |
|  | Propylene polymer composition Acquisition amount (kg/h) | 27.0 | 28.7 |

TABLE 3

|  |  | Example 1 | Example 2 | Example 3 | Example 4 | Example 5 | Example 6 |
|---|---|---|---|---|---|---|---|
| Propylene polymer (1) | Content (% by mass) | 5.2 | 4.9 | 4.8 | 4.7 | 7.3 | 6.0 |
|  | Propylene monomer unit (% by mass) | 100 | 100 | 100 | 100 | 100 | 100 |
| Propylene-α-olefin copolymer (2) | Content (% by mass) | 94.8 | 95.1 | 95.2 | 95.3 | 92.7 | 94.0 |
|  | Propylene monomer unit (% by mass) | 88.2 | 84.7 | 83.3 | 81.5 | 87.9 | 85.8 |
|  | 1-Butene monomer unit (% by mass) | 8.2 | 12.0 | 13.4 | 15.2 | 8.3 | 11.1 |
|  | Ethylene monomer unit (% by mass) | 3.6 | 3.3 | 3.3 | 3.3 | 3.8 | 3.1 |
| Wb (% by mass) |  | 16.5 | 23.3 | 26.7 | 33.0 | 21.1 | 24.4 |
| Th (° C.) |  | 73.0 | 69.5 | 67.5 | 65.0 | 71.5 | 70.0 |
| Th' (° C.) |  | 79.5 | 73.0 | 71.0 | 67.0 | 76.0 | 74.0 |
| −1.79 × Th + 150 (% by mass) |  | 19.3 | 25.6 | 29.2 | 33.7 | 22.0 | 24.7 |
| −1.79 × Th' + 150 (% by mass) |  | 7.7 | 19.3 | 22.9 | 30.1 | 14.0 | 17.5 |
| MFR (g/10 min) |  | 3.2 | 2.7 | 3.7 | 3.4 | 3.4 | 3.9 |
| HST (° C.) |  | 117 | 110 | 106 | 99 | 115 | 115 |
| Blocking strength (N/12 cm$^2$) |  | 4.5 | 5.9 | 6.5 | 7.9 | 4.6 | 4.3 |

TABLE 4

|  |  | Comparative Example 1 | Comparative Example 2 |
|---|---|---|---|
| Propylene polymer (1) | Content (% by mass) | 5.3 | 4.8 |
|  | Propylene monomer unit (% by mass) | 100 | 100 |
| Propylene-α-olefin copolymer (2) | Content (% by mass) | 94.7 | 95.2 |
|  | Propylene monomer unit (% by mass) | 79.5 | 77.3 |
|  | 1-Butene monomer unit (% by mass) | 17.2 | 19.5 |
|  | Ethylene monomer unit (% by mass) | 3.3 | 3.2 |
| Wb (% by mass) |  | 44.9 | 54.7 |
| Th (°C.) |  | 59.0 | 54.0 |
| Th' (°C.) |  | 61.0 | 56.5 |
| −1.79 × Th + 150 (% by mass) |  | 44.4 | 53.3 |
| −1.79 × Th' + 150 (% by mass) |  | 40.8 | 48.9 |
| MFR (g/10 min) |  | 5.7 | 3.4 |
| HST (°C.) |  | 95 | 87 |
| Blocking strength (N/12 cm$^2$) |  | 10.7 | 12.8 |

What is claimed is:

1. A propylene polymer composition comprising: a propylene polymer (1) and a propylene-α-olefin copolymer (2),
wherein a content of the propylene polymer (1) is 2% by mass to 25% by mass with respect to 100% by mass of a total content of the propylene polymer (1) and the propylene-α-olefin copolymer (2), wherein
the propylene polymer (1) comprises:
a polymer containing 94% by mass or more of a monomer unit derived from propylene,
the propylene α-olefin copolymer (2) comprises:
a copolymer containing 60% by mass or more and less than 94% by mass of a monomer unit derived from propylene and more than 6% by mass and 40% by mass or less of a monomer unit derived from an α-olefin having 4 to 12 carbon atoms, and wherein
the propylene polymer composition satisfies the following requirement (3):
Requirement (3):
the following Expression (3-1) is satisfied in a temperature rising elution fractionation method in which ortho-dichlorobenzene is used as a solvent and a temperature range is set to 0° C. to 140° C., $$Wb \leq -1.79 \times Th + 150 \tag{3-1}$$

wherein Wb represents a cumulative elution amount at 0° C. to 50° C., and
Th represents a temperature (° C.) of 0° C. to 80° C. or 110° C. to 140° C. at which a cumulative elution amount is 65% by mass when a total of a cumulative elution amount at 0° C. to 80° C. and a cumulative elution amount at 110° C. to 140° C. is 100% by mass.

2. The propylene polymer composition according to claim 1, wherein the monomer unit derived from an α-olefin having 4 to 12 carbon atoms contained in the propylene-α-olefin copolymer (2) is a monomer unit derived from 1-butene.

3. The propylene polymer composition according to claim 1, wherein the propylene-α-olefin copolymer (2) contains 70% by mass to 92% by mass of the monomer unit derived from propylene and 8% by mass to 30% by mass of the monomer unit derived from an α-olefin having 4 to 12 carbon atoms.

4. The propylene polymer composition according to claim 1, wherein the propylene-α-olefin copolymer (2) further contains 2% by mass to 6% by mass of a monomer unit derived from ethylene.

5. The propylene polymer composition according to claim 1, wherein the propylene polymer (1) contains 95% by mass or more of the monomer unit derived from propylene.

6. The propylene polymer composition according to claim 1, wherein the content of the propylene polymer (1) is 3% by mass to 20% by mass.

7. A film comprising the propylene polymer composition according to claim 1.

8. The film according to claim 7, wherein the film is a biaxially stretched film.

* * * * *